United States Patent [19]
Fujii et al.

[11] Patent Number: 5,392,395
[45] Date of Patent: Feb. 21, 1995

[54] IMAGE EDITING SYSTEM FOR TRANSMISSION NETWORK SUPERVISION

[75] Inventors: Yasuo Fujii; Eiji Iida, both of Kawasaki, Japan

[73] Assignee: Fujitsu Limited, Japan

[21] Appl. No.: 924,545

[22] Filed: Jul. 31, 1992

[30] Foreign Application Priority Data

Aug. 1, 1991 [JP] Japan .................. 3-192845

[51] Int. Cl.[6] .............................................. G06F 15/62
[52] U.S. Cl. ................................................... 395/164
[58] Field of Search ............... 395/123, 150, 164, 148, 395/500, 155, 140, 153, 156, 157, 161, 162; 358/448, 452, 500; 379/59, 96; 382/1, 8, 61

[56] References Cited

U.S. PATENT DOCUMENTS

| | | | |
|---|---|---|---|
| 4,885,699 | 12/1989 | Taoda et al. | 395/150 |
| 4,970,666 | 11/1990 | Welsh et al. | 395/123 |
| 4,985,848 | 1/1991 | Pfeiffer et al. | 395/164 |
| 5,179,652 | 1/1993 | Rozmanith et al. | 395/155 |

FOREIGN PATENT DOCUMENTS 63-236425 10/1988 Japan .
63-246954 10/1988 Japan .
2159698 6/1990 Japan .

*Primary Examiner*—Mark R. Powell
*Assistant Examiner*—U. Chauhan
*Attorney, Agent, or Firm*—Greer, Burns & Crain, Ltd.

[57] ABSTRACT

An image editing system for transmission network supervision for comprehensibly displaying the status of a plurality of stations and the transmission routes connecting them in a specific area. Initially, station data are created as a data source for graphically displaying each of the stations within the area. The station data are stored in a first memory. Then area data are created as a data source for graphically displaying a map of the area. The area data are stored in a second memory. Map data are also created to display graphically an area map based on the station data and area data. The map data are stored in a third memory. The area map includes an image map that is a map of the area reduced to a desired scale, the multiple stations superimposed on the image data, and the transmission routes connecting these stations. The area map is displayed on a monitor by use of the map data retrieved from the third memory.

2 Claims, 16 Drawing Sheets

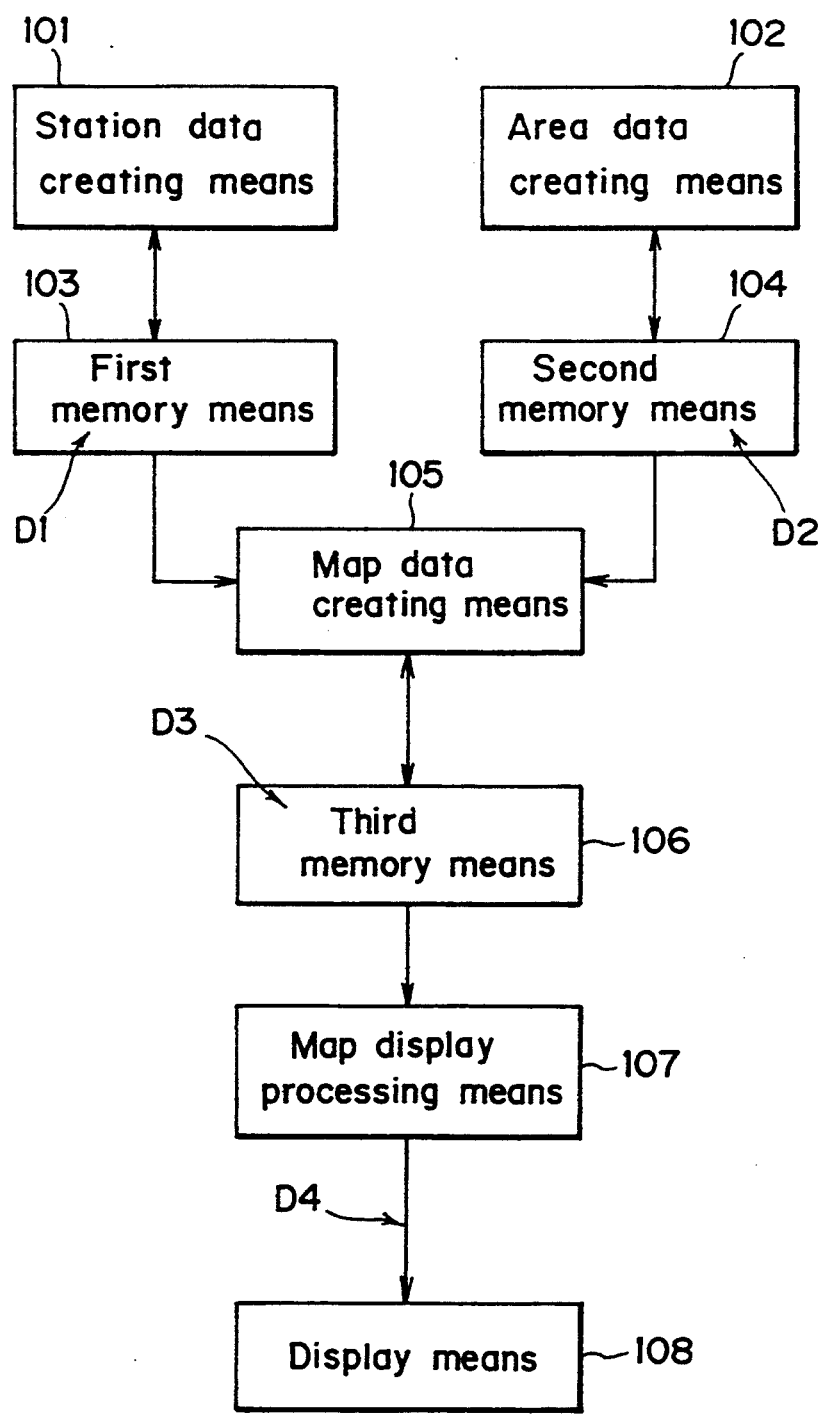

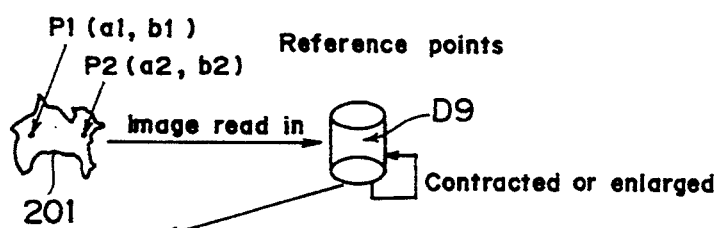
FIG.2A
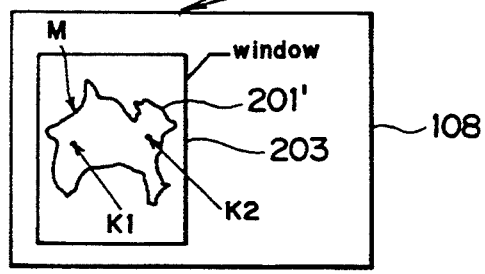
FIG.2B
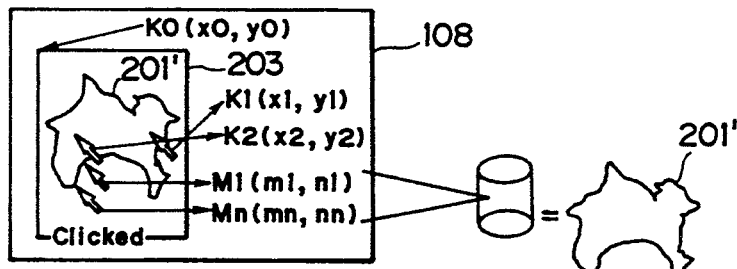
FIG.2C
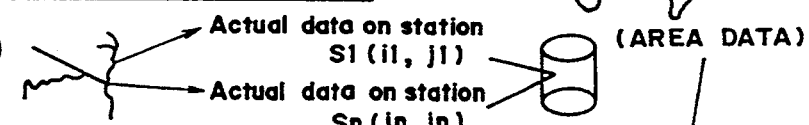
FIG.2D
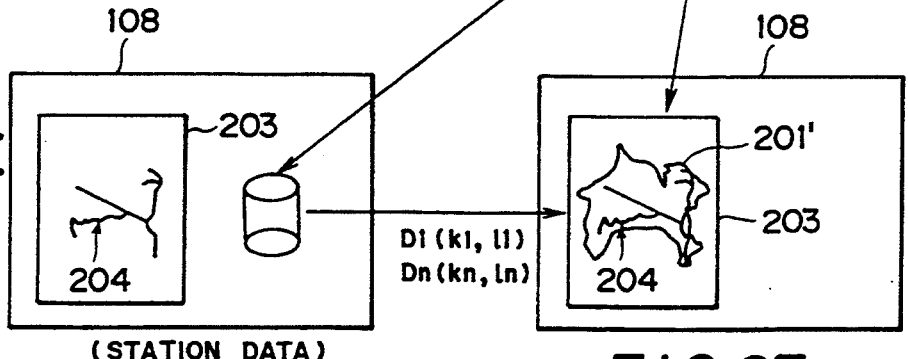
FIG.2E
FIG.2F

FIG. 5

```
    00        10        20        30        40        50        60        70        80
    123456789012345678901234567890123456789012345678901234567890123456789012345678901234567890
01 ┌─────────────────────────────────────────────────────────────────────────────────────┐
02 │ C33    << STATION DATA SET                       >>       YYYY MM/DD hh:mm          │
03 │ ─────────────────────────────────────────────────────────────────────────── FUJITSU │
04 │                                                                                     │
05 │        Station data in SSSSSSSSSS area ←——14                                        │
06 │                                                                                     │
07 │        Set station name =>SSSSSSSSSS ←——15                                          │
08 │                                                                                     │
09 │        Set station code =>zzz9 ←——16                                                │
10 │                                                                                     │
11 │        Set latitude  =>z9. z9:z9 ←——17                                              │
12 │                                                                                     │
13 │        Set longitude =>zz9. z9:z9 ←——18                                             │
14 │        Set station role  1: national center                                         │
15 │                           2: zone center                                            │
16 │                           3: sub zone center                                        │
17 │                           4: maintenance center                                     │
18 │                           5: remote center                                          │
19 │                           6: repeater station                                       │
20 │   =>X ←——19                                                                         │
21 │                                                                                     │
22 │ EEEEEEEEEEEEEEEEEEEEEEEEEEEEEEEEEEEEEEEEEEEE OPERATION: STATION SET                 │
23 │ F1: CLOSE    F2: SET UP    F3: PREV    F4: NEXT    ENT: DATA READ                   │
24 └─────────────────────────────────────────────────────────────────────────────────────┘
```

| Region name | 40 |
| x and y coordinates of reference point 1 | 41 |
| Latitude and longitude of reference point 1 | 42 |
| x and y coordinates of reference point 2 | 43 |
| Latitude and longitude of reference point 2 | 44 |
| Graphic count | 45 |
| Graphic ID | 46 |
| Plotted point count | 47 |
| Coordinate value | 48 |
| Graphic ID | 49 |
| Plotted point count | 50 |
| Plotted point count | 51 |
| Coordinate value | 52 |

[5,392,395]

IMAGE EDITING SYSTEM FOR TRANSMISSION NETWORK SUPERVISION

BACKGROUND OF THE INVENTION

1. Field of the Invention

The present invention relates to an image editing system for transmission network supervision to be incorporated in the centralized supervisory system of a transmission network.

2. Description of the Related Art

Recent years have seen the growing demand for centralized supervisory systems that supervise transmission equipment and networks comprising personal computers, minicomputers and workstations. Today, the trends are toward enhancing the centralized supervisory function for more adequate supervision over the target equipment and networks. What is desired in particular is the building of an improved centralized supervisory system for transmission network supervision which would display the entire transmission routes on a high-resolution graphic display for comprehensive supervision.

Conventional centralized supervisory systems for transmission network supervision display a listing of stations and transmission routes. In case of a station or route failure, the relevant station and route names on display are distinguished by color. Today's transmission networks have yet to be supervised centrally by a system showing detailed graphic maps on its display for supervisory purposes.

Such prior art centralized supervisory systems may provide adequate information about station and transmission route failures in list form but, unlike putative systems showing map indications, fail to attract visually the operator's attention. The resulting inadequacy in man-machine interface often leads to belated detection of failure indications or their outright oversight. Without the graphic aid, failures when and if they occur may be left unattended, entailing serious consequences.

SUMMARY OF THE INVENTION

It is therefore an object of the present invention to provide an image editing system for transmission network supervision capable of letting the operator supervise stations and data transmission routes in a detailed map shown on a display unit.

It is another object of the present invention to provide an image editing system for transmission network supervision capable of constituting a centralized supervisory system for transmission network supervision which will allow the operator to address quickly and adequately any detected failures under supervision through an improved man-machine interface.

In accordance with an aspect of the present invention, there is provided an image editing system for transmission network supervision comprising: means for creating station data as a data source for graphically displaying a plurality of stations within a specific area; first memory means for storing the station data; means for creating area data as a data source for graphically displaying a map of the specific area; means for creating, on the basis of the station data and the area data, map data for graphically displaying an area map, the area map including an image map of the specific area reduced to a desired scale, the plurality of stations superimposed thereon and transmission routes connecting the plurality of stations; third memory means for storing the map data; and display means for graphically displaying the area map based on the map data.

The invention involves, based on two reference points that are input upon entry of area data, converting the latitude and longitude of each of the plurality of stations into coordinates on the display means.

The area data creating means creates the area data as follows. Initially, two reference points are designated on the map of the specific area. The map is read by image scanner and converted to image data. The image data are then used to display an image map on the display means. Plotting the two reference points and an outer frame surrounding the image map provides the map coordinates. Preferably the image map is displayed within a window established on the display means. The reference points and the outer frame are plotted on the screen preferably by clicking a mouse attached to the system.

The map data creating means creates the map data as follows: Initially, the x and y direction scale values of the image map are obtained. Then the x and y coordinate values of points that provide reference for displaying the window are obtained.

The actual latitude of each station minus the x coordinate values of the window reference points is multiplied by the x direction scale value. This provides the x coordinate value of the station display coordinates for displaying the station on the image map shown in the window. The actual longitude of each station minus the y coordinate values of the window reference points is then multiplied by the y direction scale value. This provides the y coordinate value of the station display coordinates for displaying the station on the image map shown in the window.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 1 is a block diagram of an image editing system for transmission network supervision embodying the present invention, the diagram illustrating the principal constitution of the embodiment;

FIGS. 2A through 2F are views depicting the process for editing supervisory images with the embodiment;

FIG. 5 is a view indicating a typical station data entry screen provided by the embodiment;

FIG. 13 is a view depicting the structure of typical area data in connection with the embodiment;

DESCRIPTION OF THE PREFERRED EMBODIMENTS

Figure 3:
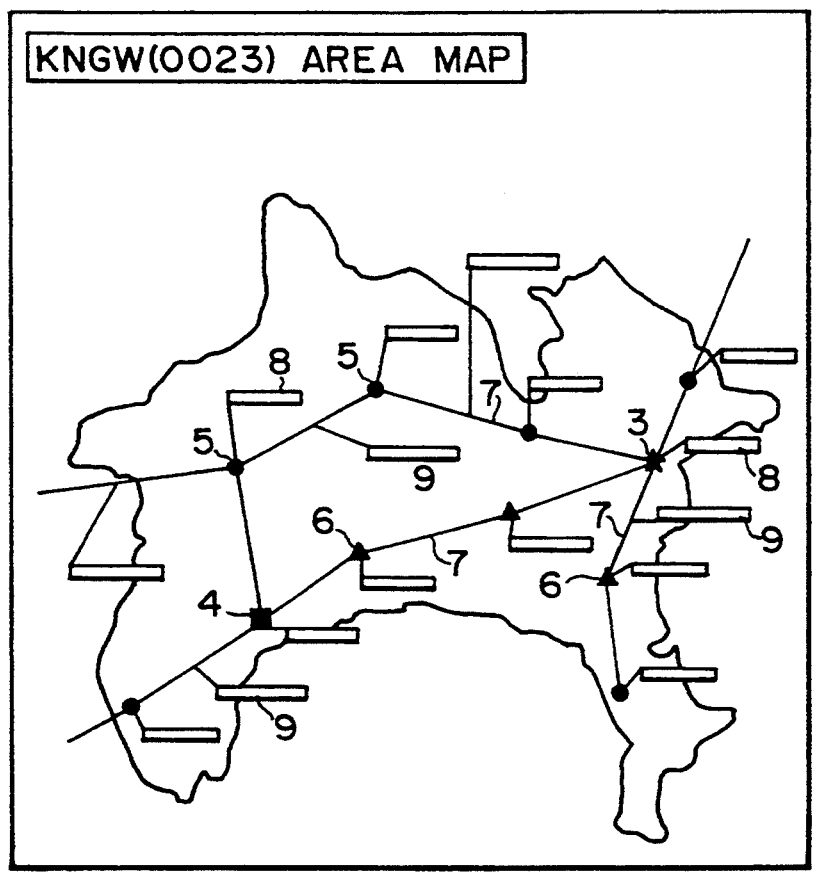
FIG. 3 is a view showing a typical area map on a graphic display according to the embodiment.

The principal constitution of the invention will now be described with reference to FIG. 1. Station data creating means 101 creates station data D1 as a data source for graphically displaying each of a plurality of stations within a specific area. The station data D1 are stored in first memory means 103. Area data creating means 102 creates area data D2 as a data source for graphically displaying a map of the specific area. The area data D2 are stored in second memory means 104.

Map data creating means 105 creates map data D3 for graphically displaying an area map based on the station data D1 in the first memory means 103 and on the area data D2 in the second memory means 104. The map data D3 are stored in third memory means 106.

The area map includes an image map for graphically displaying the specific area at a desired scale, the plurality of stations superimposed on the image map, and transmission routes connecting these stations. The map data D3 are converted by map display processing means 107 into map display data D4. Display means 108 such as a graphic display unit displays the area map on the basis of the map display data D4.

The station data D1 are created by the station data creating means 101 regarding the name, management code number, latitude, longitude and type of each of the multiple stations entered through input means (e.g., keyboard) within the specific area.

The area data creating means 102 creates the area data D2 as follows: Two reference points P1 and P2 are first designated where appropriate on a specific area map 201 shown in FIG. 2A. The map 201 containing the reference points P1 and P2 is read by image scanner and converted to image data D9. The image data D9 are used to display an image map 201' on the display means 108, as depicted in FIG. 2B. The two display reference points K1 and K2 in the image map 201' as well as an outer frame M surrounding the image map are plotted by clicking a mouse, as illustrated in FIG. 2C. This provides the coordinate values K1(x1, y1), K2(x2, y2), M1(m1, n1),..., Mn(mn, nn), creating the area data D2.

When the image data D9 are used to display the image map 201' on the display means 108, a window 203 of a desired size is preferably established on the display means 108 so that the image map 201' will be shown within that window 203.

The map data creating means 105 creates the map data as follows: First, the absolute difference between the x coordinates x1 and x2 of the display reference points K1 and K2 in FIG. 2B is divided by the absolute difference between the latitude values a1 and a2 of the reference points P1 and P2 on the map 201 of FIG. 2A. This provides the x direction scale value $\alpha$ x of the image map 201'. Then the absolute difference between the y coordinate values y1 and y2 of the display reference points K1 and K2 in FIG. 2B is divided by the absolute difference between the longitude values b1 and b2 of the reference points P1 and P2 in FIG. 2A. This provides the y direction scale value $\alpha$ y of the image map 201'.

Next, the x coordinate value x1 of the display reference point K1 in FIG. 2B is divided by the x direction scale value $\alpha$ x. The resulting quotient is subtracted from the latitude value a1 of the reference point P1 in FIG. 2A. This provides the x coordinate value x0 of a window reference point K0 that provides reference for displaying the window 203 of FIG. 2C. The y coordinate value y1 of the display reference point K1 is divided by the y direction scale value $\alpha$ y. The resulting quotient is subtracted from the longitude value b1 of the reference point P1. This provides the y coordinate value y0 of the window reference point K0.

The x coordinate value x0 of the window reference point K0 is subtracted from the actual latitude of the station shown in FIG. 2D. The resulting difference is multiplied by the x direction scale value $\alpha$ x. This provides, as shown in FIG. 2E, the x coordinate value Kn of the station display coordinates Dn for displaying the station on the image map 201' in the window 203. The y coordinate value y0 of the window reference point K0 is subtracted from the actual longitude of the station depicted in FIG. 2D. The resulting difference is multiplied by the y direction scale value $\alpha$ y. This provides, as shown in FIG. 2E, the y coordinate value Ln of the station display coordinates Dn for displaying the station on the image map 201' in the window 203. These operations create the station data D1.

The station data D1 and area data D2 are then combined. This causes the display means 108 to display the image map 201' of the specific area reduced to a desired scale, as illustrated in FIG. 2F. On the image map 201', the target stations corresponding to the actual station locations are symbolically displayed. The stations symbolically displayed are connected by lines 204 approximating the actual circuit connections. The names of the stations and those of the transmission routes connecting these stations are also displayed, as shown in FIG. 3.

As described, the invention allows the display means 108 to display the detailed image map 201' having the multiple stations superimposed thereon along with transmission routes 204 connecting these stations. In addition, the station names and transmission route names are also superimposed on the image map 201' for display. This feature affords an enhanced man-machine interface that permits more effective supervision of a transmission network.

FIG. 3 shows a typical area map on a graphic display. In the figure, a national center station 3 plays the principal role in the centralized supervisory system for transmission network supervision. A maintenance center station 4, remote center stations 5 and repeater stations 6 are also included. The stations 3, 4, 5 and 6 are connected by transmission routes 7. Reference numeral 8 indicates the name of each station, and reference numeral 9 points to the name of each of the transmission routes 7.

The locations of the stations and the transmission routes connecting them, as displayed within the area map of FIG. 3, reflect the actual locations. In normal state, the stations 3, 4, 5 and 6, the transmission routes 7, the station names 8 and the transmission route names 9 are all displayed in green. Each of the stations 3, 4, 5 and 6 has a plurality of transmission equipment. In case a transmission equipment failure occurs in a station, the display color of that station changes to yellow or to red depending on the severity of the equipment failure. Likewise, if a failure develops on any of the transmission routes 7, the display color of the affected route changes to yellow or to red depending on the severity of the route failure. At the same time, the names 8 and 9 of the affected station and transmission route change in color to yellow or to red depending on the severity of the respective failures, and the names with their colors changed begin to flash.

Figure 4:
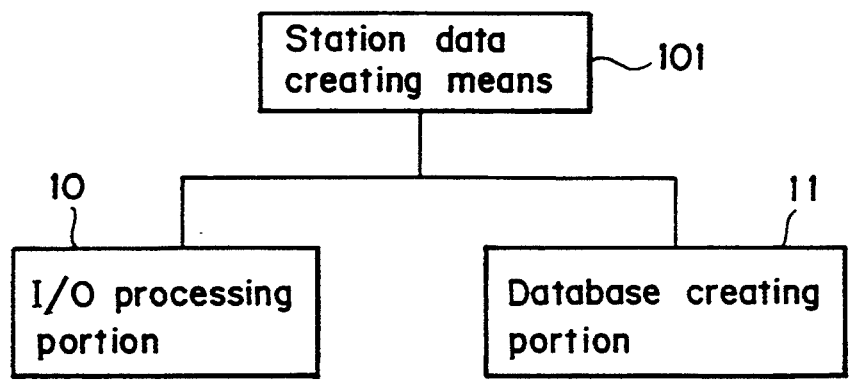
FIG. 4 is a block diagram of station data creating means constituting part of the embodiment.

Below is a detailed description of how the image editing system for transmission network supervision of the invention is constructed and how it works. As shown in FIG. 4, the station data creating means 101 comprises an I/O processing portion 10 and a database creating portion 11. The I/O processing portion 10 interfaces with a CRT (the graphic display 108 in this example). In doing so, the I/O processing portion 10 displays a screen picture of FIG. 5 on the CRT and, according to the instructions displayed, supplies the database creating portion 11 with the data entered through the keyboard. In turn, the database creating portion 11 develops in an area data management table 13 of FIG. 6 the data received from the I/O processing portion 10. The area data management table 13 containing the station data D1 is stored in the first memory means 103 shown in FIG. 1.

The screen picture 12 displayed on the CRT in FIG. 5 is a station data entry screen picture 12 through which stations of a designated area are entered. This example involves entering Yokohama station, Kawasaki station and other stations in Kanagawa Prefecture, Japan. The data to be entered include the names, management code numbers, latitudes, longitudes and types of the stations involved. The operator inputs the data through the keyboard according to the instructions indicated on the screen picture 12.

On the screen picture 12, the line pointed to by an arrow 14 displays an already entered area name (Kanagawa Prefecture in this example). Having confirmed the area name, the operator enters a station name (e.g., Yokohama) in the line pointed to by an arrow 15. In the line indicated by an arrow 16, the operator enters a station management code number for managing the named station. The line indicated by an arrow 17 accommodates the degrees, minutes and seconds of station latitude entered by the operator. Likewise, the line indicated by an arrow 18 accommodates the degree, minutes and seconds of station longitude entered by the operator. The line pointed to by an arrow 19 accepts a station type that is entered. The station type is selected from numbers 1 through 6 displayed in the "Set station role" field on the screen picture.

The data thus entered are held in the first memory means 103 as part of a station database. The structure of the station data D1 will now be described with reference to FIG. 6. It should be noted that the station data D1, as discussed above, are stored in the first memory means 103 in the format of the area data management table 13.

The area data management table 13 is made of a header 20 and a station managing portion 21. The header 20 is constituted by an area name 22 (Kanagawa Prefecture in this example), an area code number 23, an internal area management number 24 and an owned station count 25. The station managing portion 21 is composed of internal station management numbers 26, 26', etc. and station data pointers 27, 27'etc. There are as many station management numbers and station data pointers as the number of stations owned within the area.

The station data pointer 27 points to the address of the station data D1 in the memory means 103. The station data D1 pointed to by the pointer 27 comprise a station name 28, a station type code 29, a station latitude 30 and a station longitude 31. The same construction holds for the station data pointer 27' except that the contents of the settings-in individual station data D1, D1', etc. are different. For example, the station name 28 in the station data D1 is "Yokohama," whereas the station name 28' in the station data D1' is "Kawasaki." The station type code 29', station latitude 30' and station longitude 31' are established accordingly.

Figure 7:
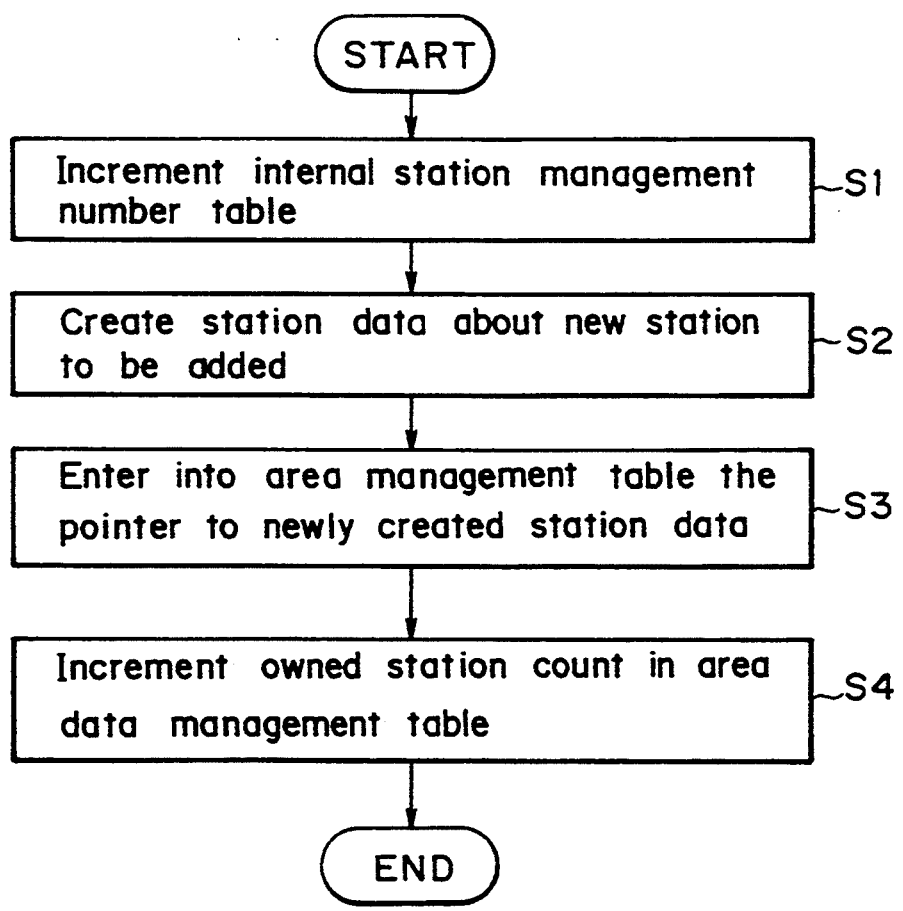
FIG. 7 is a flowchart of steps to follow with the embodiment when data about a new station are to be added.
Figure 8:
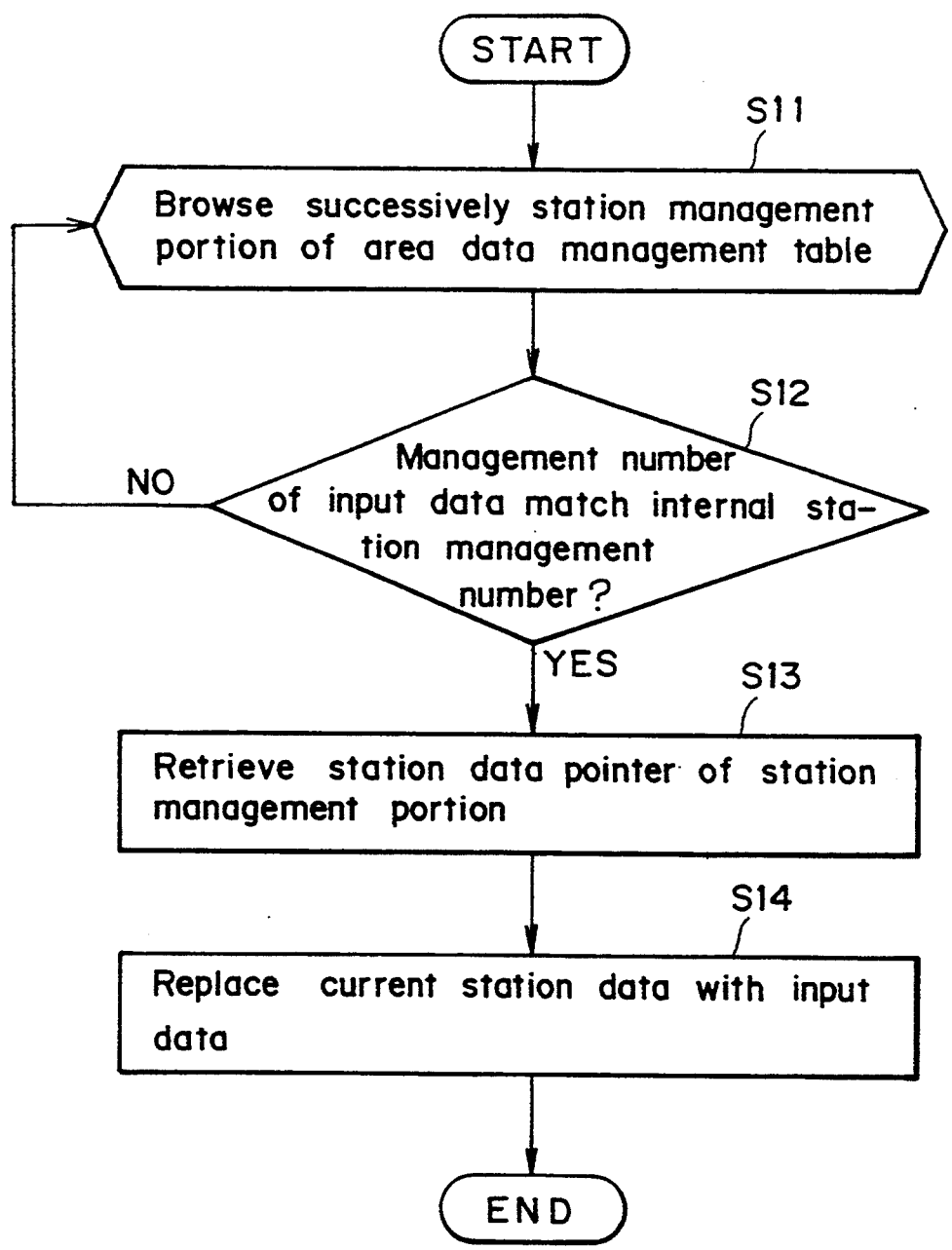
FIG. 8 is a flowchart of steps to follow with the embodiment when data about an existing station are to be updated.
Figure 9:
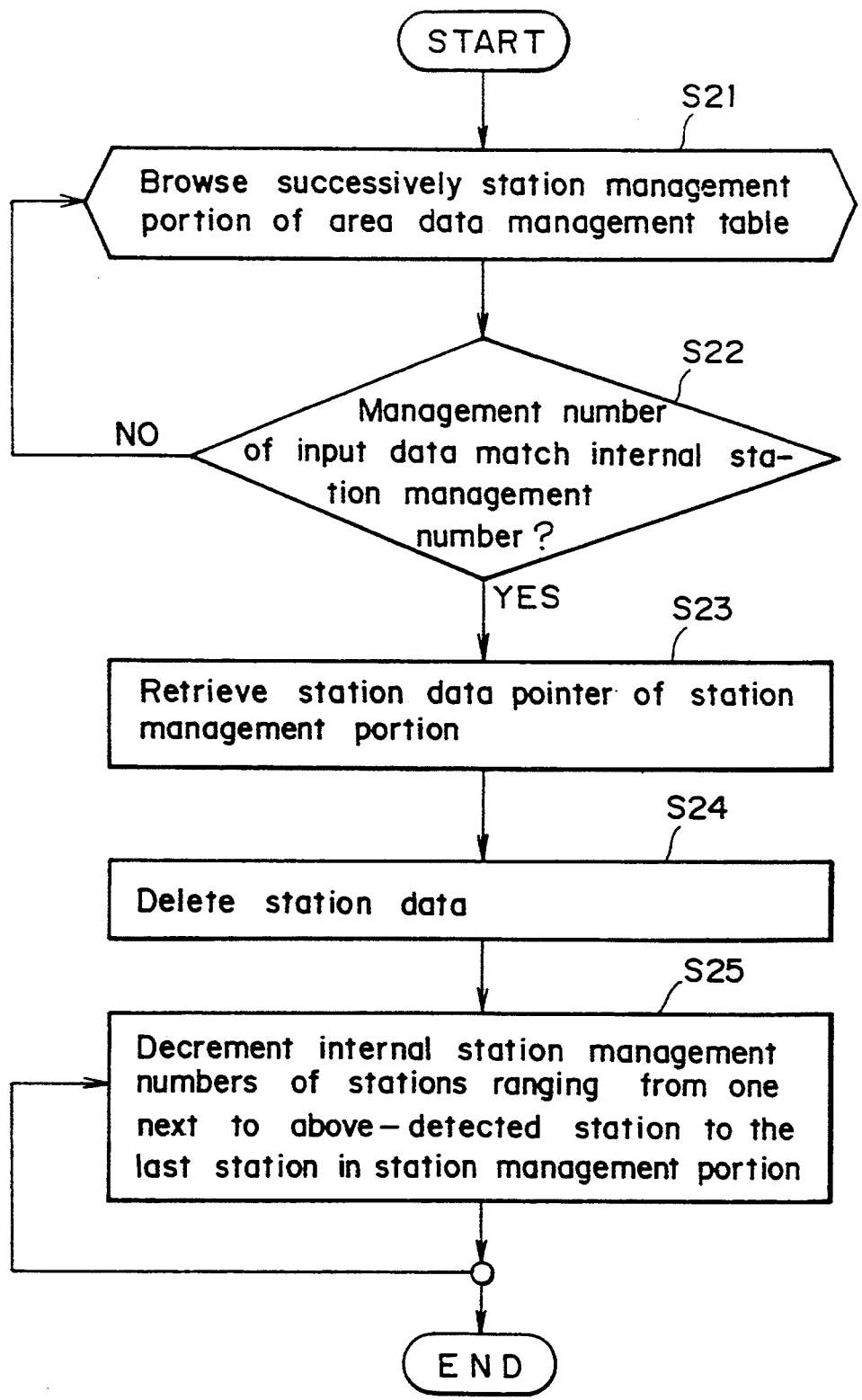
FIG. 9 is a flowchart of steps to follow with the embodiment when data about an existing station are to be deleted.

How the database creating portion 11 creates the station data D1 will now be described with reference to the flowcharts of FIGS. 7, 8 and 9.

Figure 6:
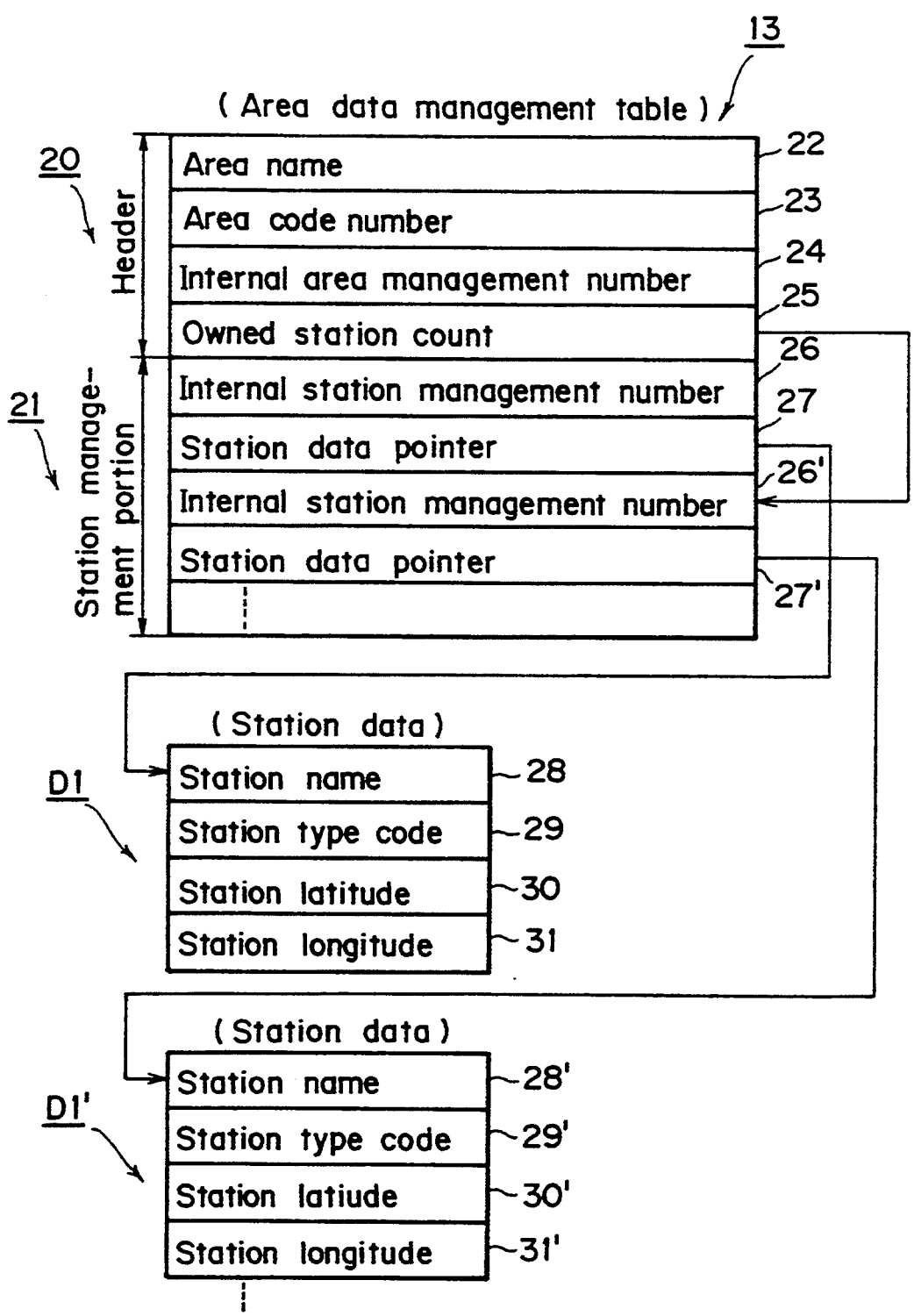
FIG. 6 is a view describing the structure of station data within a given area in connection with the embodiment.

First to be described are the steps to add data about a new station. FIG. 7 is referenced for the description. In step S1, the internal station management number table 26 of FIG. 6 is incremented by 1. Step S2 creates the station data D1 in FIG. 6 about the newly added station. Step S3 enters in the area data management table 13 the pointer to the newly created station data, i.e., the newly created station data pointer 27 created in step S2. Step S4 increments the owned station count 25 in the area data management table 13 of FIG. 6. These operations store the area data management table 13, supplemented with the new station data, into the first memory means 103.

How the data about a station are to be updated will now be described with reference to FIG. 8. In step S11, the station managing portion 21 in the area data management table 13 is browsed successively. Step S12 checks to see if the management number of the data entered through the keyboard matches the internal station management number 26 in the station managing portion 21. If the check results in a mismatch, step S11 is reached again. If the two management numbers match, step S13 is reached.

Step S13 retrieves the station data pointer 27 indicated by the internal station management number 26 that has matched the management number of the input data. Step S14 substitutes the input data from the keyboard for the station data D1 pointed to by the pointer 27 retrieved in step S13. These operations update the station data about the station that has been updated in its settings. The resulting area data management table 13 is stored in the first memory means 103.

How the data about a station are to be deleted will now be described with reference to FIG. 9. In step S21, the station managing portion 21 in the area data management table 13 is browsed successively. Step S22 checks to see if the management number of the data input from the keyboard matches the internal station management number 26 of the station managing portion 21. In case of a mismatch, step S21 is reached again. If the two management numbers match, step S23 is reached.

Step S23 retrieves the station data pointer 27 indicated by the internal station management number 26 that has matched the management number of the input data. Step S24 deletes the station data D1 pointed to by the pointer 27 retrieved in step S23. Step S25 decrements by 1 the internal station management numbers 26, 26', etc. corresponding with the stations ranging from the one next to that detected in the above step to the last station in the station management portion 21. These operations delete the station data about the target station to be deleted. The resulting area data management table 13 is stored in the first memory means 103.

Below is a description of the area data creating means 102 shown in FIG. 1. What the area data creating means 102 principally offers is as follows: Initially, a desired map is read by image scanner and converted to image data which are then displayed on the graphic display unit. When the operator designates an outer frame (a polygon) of the map by clicking a mouse, the area data creating means 102 extracts the coordinate points needed to display graphically the map on the screen. These coordinate points are used as the basis for creating the area data D2.

Figure 10:
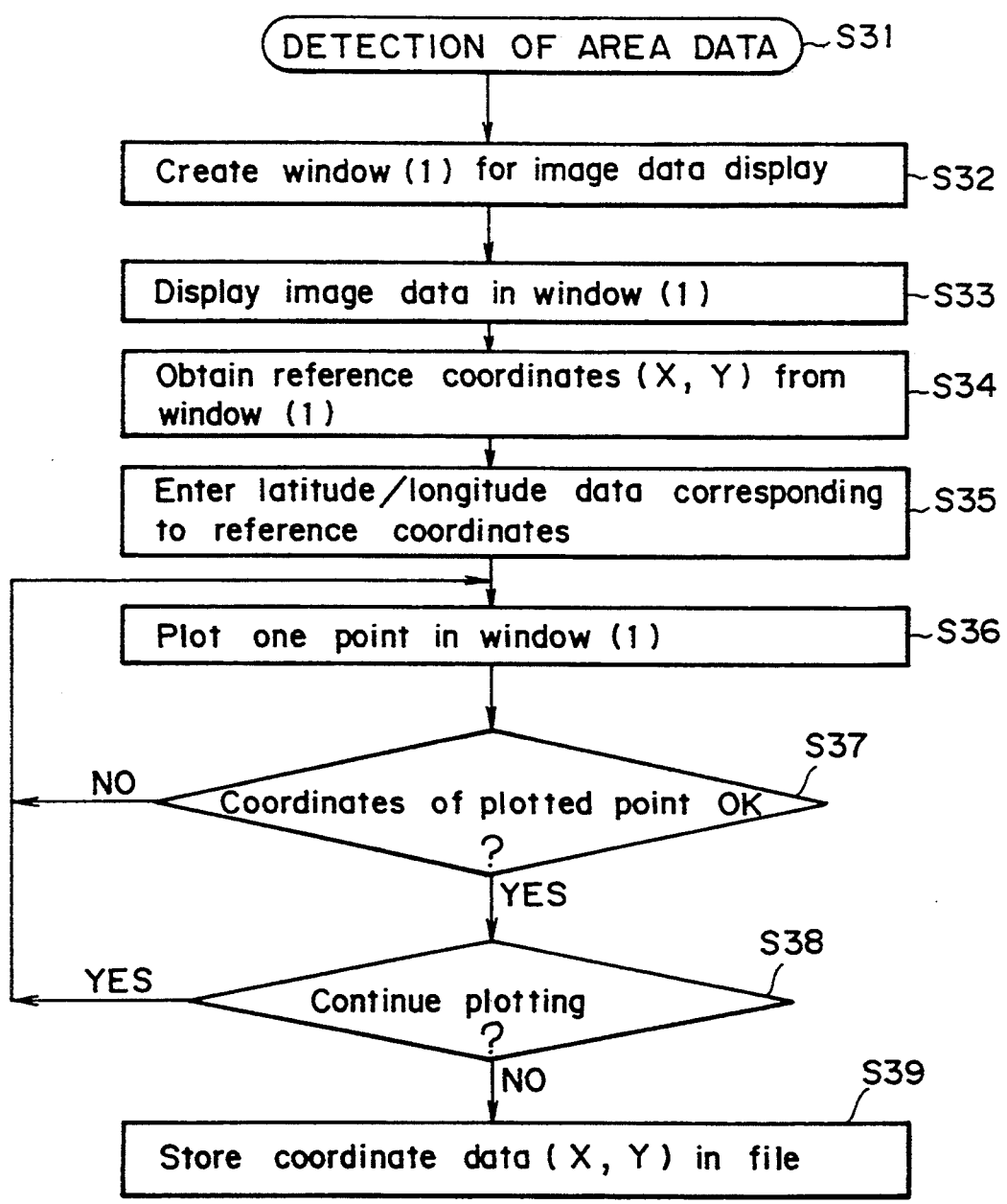
FIG. 10 s a flowchart of steps in which the area data creating means of the embodiment operates.
Figure 11:
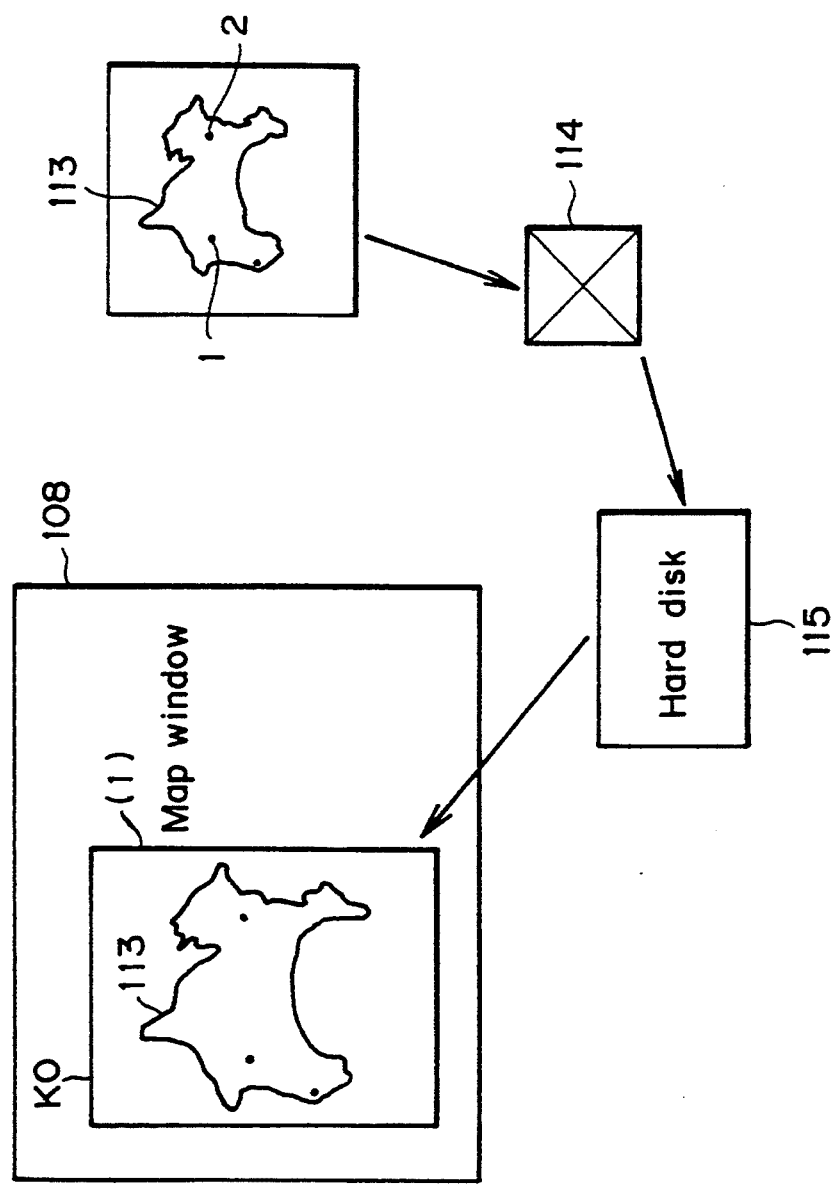
FIG. 11 is a view of a typical screen in which to create and display area data with the embodiment.

How the area data creating means 102 works will now be described with reference to the flowchart of FIG. 10. In step S31, area data are detected. Area data detection proceeds as follows: A map 113 of, say, Kanagawa Prefecture containing two reference points 1 and 2 where appropriate, as shown in FIG. 11, is read by an image scanner 114 and converted to image data. The image data are stored on a hard disk 115 (or any other appropriate storage means). Step S32 creates a display window (1) preparatory to displaying the image data on the graphic display 108, as depicted in FIG. 11.

Figure 12:
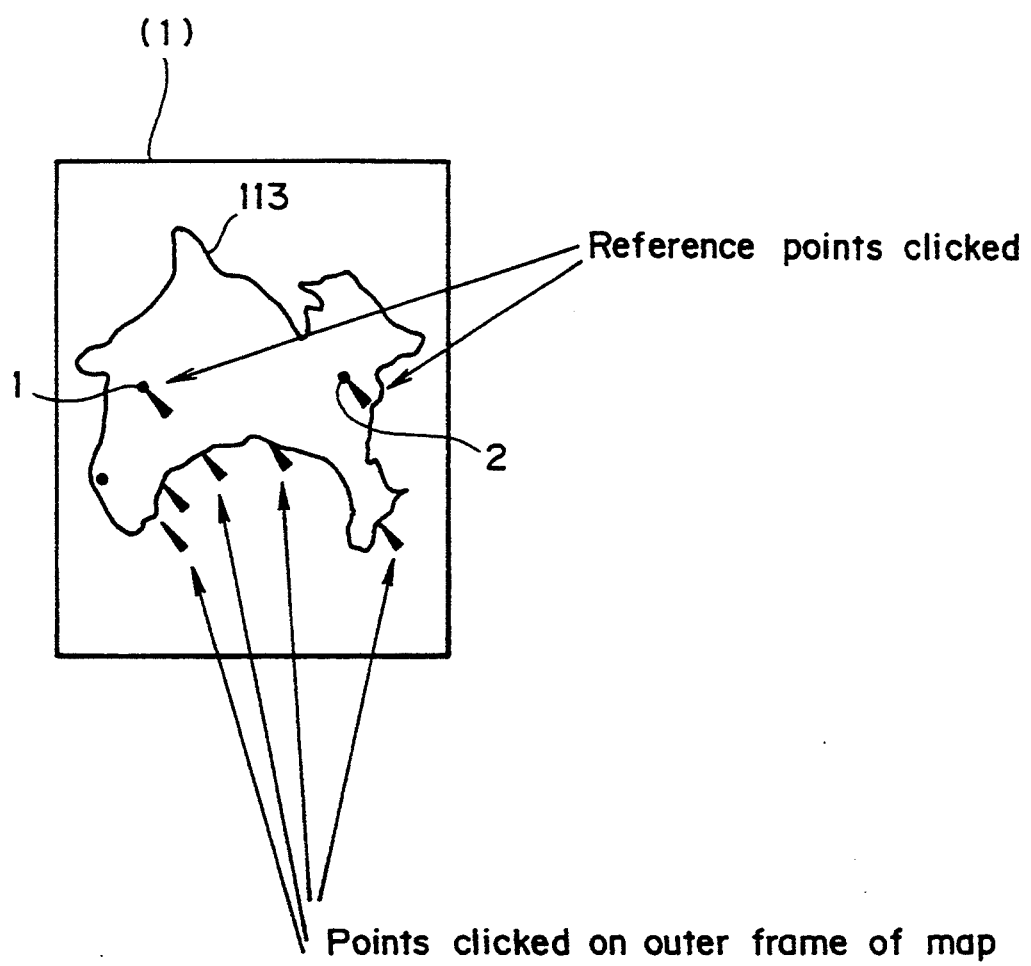
FIG. 12 is a view showing how the area data creating means illustratively performs its screen processing.

Step S33 displays the image data in the display window (1). Specifically, the image data are first retrieved from the hard disk 115. Based on the retrieved image data, the map 113 is displayed within the display window (1) on the graphic display 108. In step S34, the operator obtains reference coordinate values (X, Y; for determining the scale size) from the map 113 in the display window (1). That is, the operator designates the two reference points 1 and 2 of the map 113 in the display window (1) by clicking the mouse as shown in FIG. 12. The clicking operation determines the location of the map as it is displayed on the screen.

The coordinate values (X, Y) of the reference points 1 and 2 thus obtained are stored in the x and y coordinate regions for the reference points 1 and 2 in the structure of the area data D2. The x and y coordinate regions for the reference points 1 and 2 are numbered 41 and 43, respectively, in FIG. 13 that shows the structure of the area data D2. In step S35 of FIG. 10, the operator enters latitude and longitude information corresponding to the reference coordinate values (X, Y) acquired in step S34. That is, the operator uses the keyboard to input the latitude and longitude of the reference points 1 and 2 on the map 113. This operation stores the input latitude and longitude of the reference points 1 and 2 into longitude/latitude regions 42 and 44, respectively, shown in FIG. 13.

In step S36, one point on the outer frame of the map is plotted within the display window (1) of FIG. 12. In fact, a number of points on the outer frame of the map 113 in the display window (1) are clicked with the mouse in due course, as depicted in FIG. 12. In step S36, however, only one point is plotted by clicking the mouse once. In step S37, a check is made to see if the coordinates of the designated point are acceptable. In other words, step S37 checks to see if the coordinate data (X, Y) of the point plotted in step S36 are appropriate under system constraints. This step is intended to prevent any plotting error.

If the result of the check turns out to be unacceptable, step S36 is reached again for another plotting attempt. If the check of step S37 finds the plotted point to be appropriate, step S38 is reached. In step S38, a check is made to see if the plotting process needs to be continued. If the outer frame of the map 113 is found to be insufficiently plotted, a "yes" decision is made in step S38 and step S36 is reached again for continual plotting. If the outer frame of the map 113 is found to be sufficiently plotted, a "no" decision is made in step S38 and step S39 is reached. A rule-of-thumb number of plotted points on the outer frame of the map 113 is up to 1,000.

In step S39, the coordinate data (X, Y) are stored into a file. Specifically, the coordinate data are put into coordinate value regions 48 and 52 shown in FIG. 13. In FIG. 13, plotted point count regions 47, 50 and 53 each accommodate the number of plotted points on the outer frame of the map 113. Graphic ID (identification) regions 46 and 49 each store an ID code specific to a single map.

The graphic ID regions 46 and 49 are provided so that if a given geographic area having an island or the like therein constitutes two physically distinguishable areas on the screen, the multiple regions are used to identify these areas. For example, if the area contains an island, a graphic count region 45 accommodates a value of 2. The region name 40 in this case is "Kanagawa Prefecture."

Figure 14:
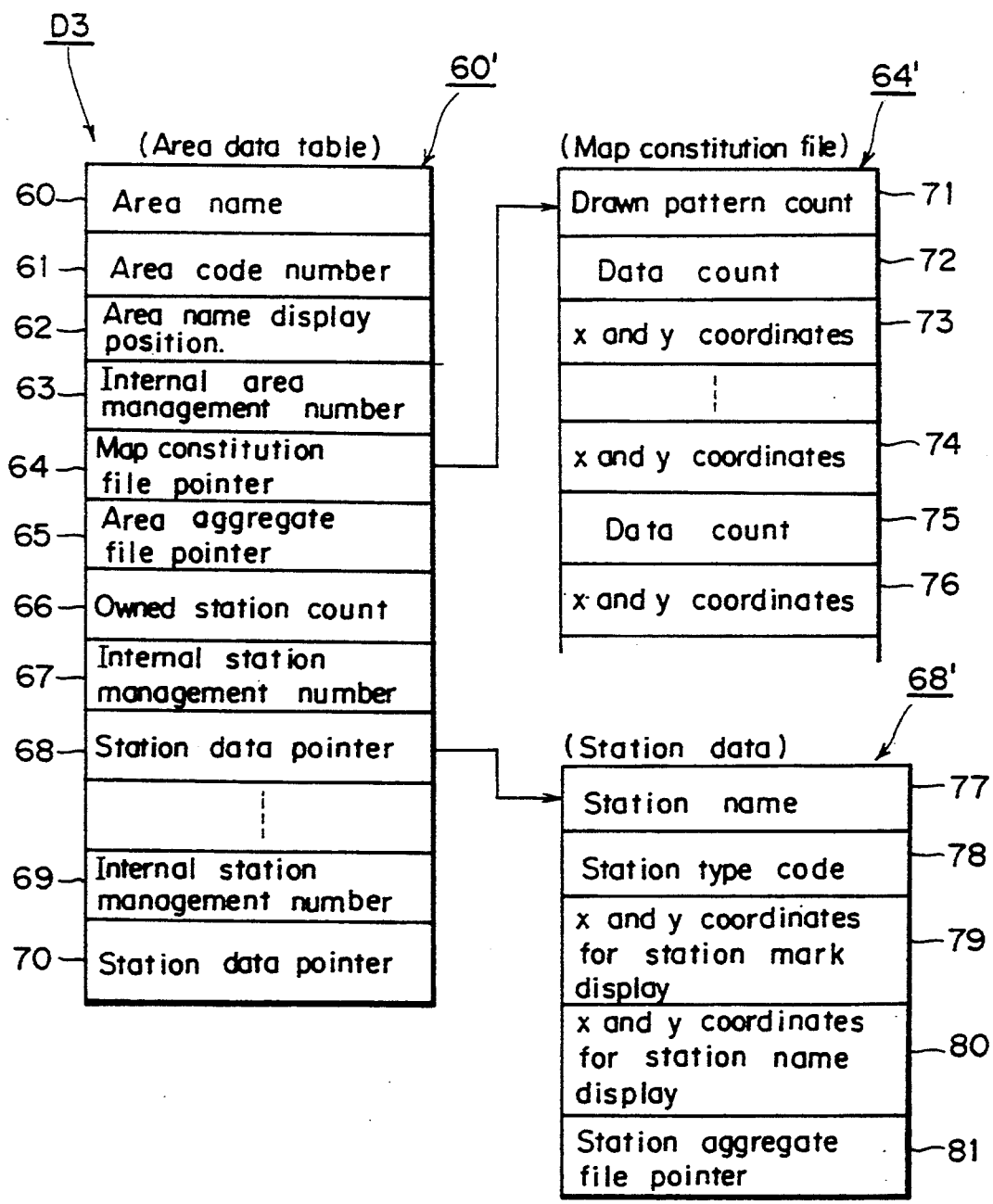
FIG. 14 is a view indicating the structure of typical map data in connection with the embodiment.

Below is a description of the map data creating means 105 shown in FIG. 1. What the map data creating means 105 principally offers is as follows: The screen display scale is calculated on the basis of the coordinates of two reference points in each area. The latitude and longitude of each station are converted from the station data to coordinates on the screen display. This creates a map database. FIG. 14 illustrates the table structure of the map data D3 created by the map data creating means 105. How the map data creating means 105 works will now be described.

In FIG. 14, an area data table 60' comprises an area name 60, an area code number 61 and an area name display position 62. The area name display position 62 designates the X and Y coordinates of the area name for display on the screen. The position is fixed for all areas. Also included in the area data table 60' are an internal area management number 63 and a map constitution file pointer 64. The map constitution file pointer 64 points to the position of a map constitution file for displaying the area in question on the screen.

An area aggregate file pointer 65 in the area data table 60' points to the position of an area aggregate file that accommodates the data for designating the color in which to draw the area in question. An owned station count 66, internal station management numbers 67 and 69 and station pointers 68 and 70 are also included in the table 60'.

In a map constitution file 64' pointed to by the map constitution file pointer 64, a drawn pattern count 71 indicates the number of physically distinguishable areas that may exist in a single geographical area, as in the case of an island being contained in one geographical area. Data counts 72 and 75 correspond to the number of angles that exist in the outer frame of the area regarded as a polygon. If there is only one area with no island contained therein, the drawn pattern count is "1". Reference numerals 73, 74 and 76 are x and y coordinates of the data stored in the data counts 72 and 75.

In station data 68' pointed to by the station data pointer 68, reference numeral 77 stands for a station name, 78 for a station type code, 79 for x and y coordinates for station mark display, and 80 for x and y coordinates for station name display. The x and y coordinates 80 for station name display are coordinates that specify the position in which to display the name of the station in question. A station aggregate file pointer 81 points to the position of a station aggregate file that stores the data for designating the color in which to draw the station.

How the map data creating means 105 works to create the table of the map data D3 will now be described in more detail with reference to the flowchart of FIG. 15. What the map data creating means 105 does involves developing the area data management table 13 of FIG. 6 into the map data D3 of FIG. 14 on the basis of the area data D2 of FIG. 13.

Figure 15:
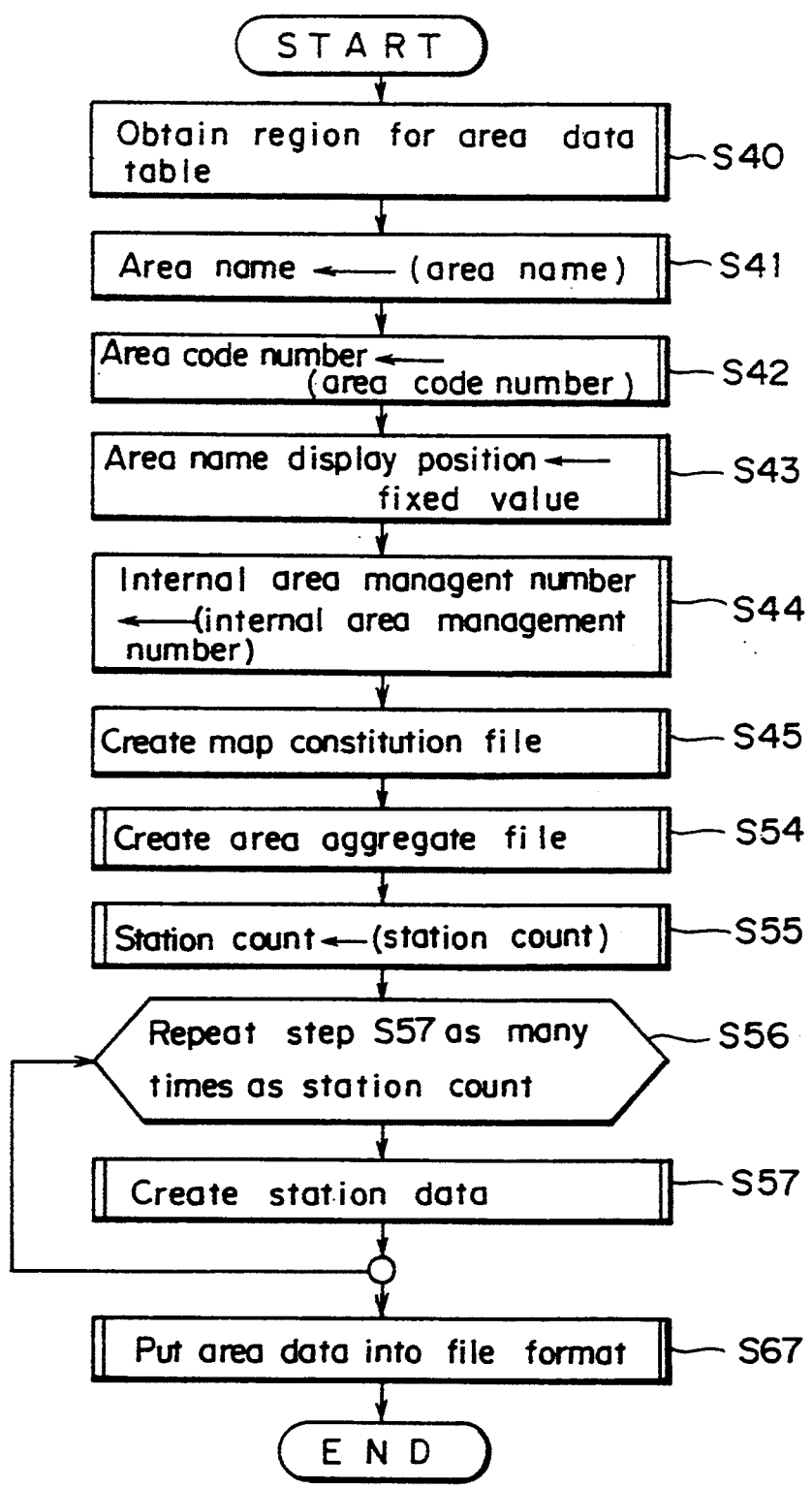
FIG. 15 is a flowchart of steps in which to create map data illustratively with the embodiment.

In step S40 of FIG. 15, an area data table region is acquired. The area data table region is a storage region of the third memory means 106 of FIG. 1 in which to create the area data table 60' of FIG. 14. In step S41, an area name is placed into the area name region 60 (see FIG. 14) of the area data table 60' previously acquired. This area name is taken from the area name region 22 of FIG. 6, i.e., Kanagawa Prefecture in this example.

In step S42, an area code number is put into the area code number region 61 of FIG. 14. This area code number is taken from the area code number region 23 of FIG. 6. In step S43, the x and y coordinate data for displaying the area name on the screen are stored into the area name display position region 62 of FIG. 14. The coordinate data stored in step S43 are fixed.

In step S44, an internal area management number 24 is placed into the internal area management number region of FIG. 14. This internal area management number is taken from the internal area management number region 24 of FIG. 6. In step S45, the map constitution file 64' of FIG. 14 is created. How the map constitution file 64' is created will now be described in more detail with reference to the flowchart of FIG. 16.

Figure 16:
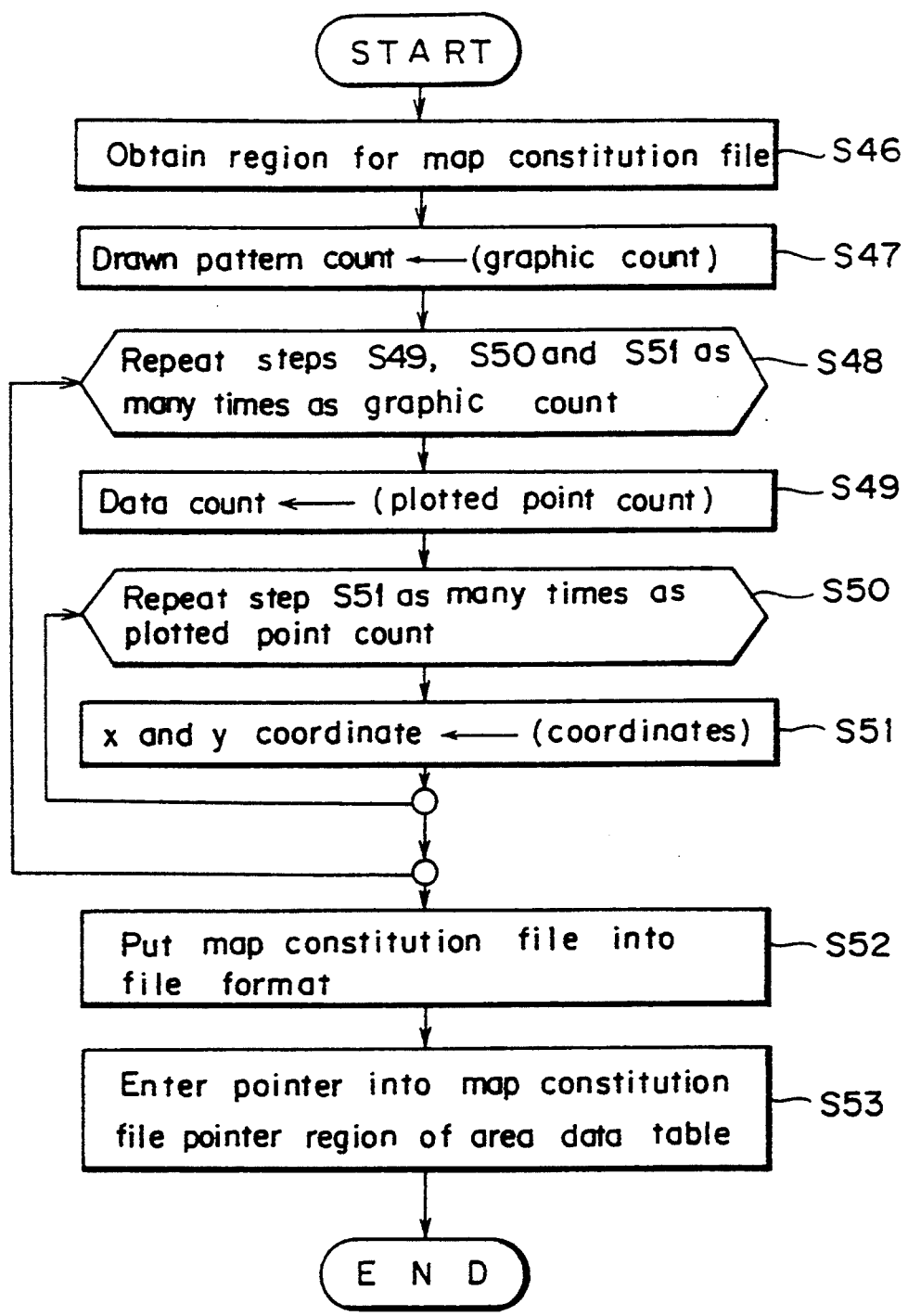
FIG. 16 is a flowchart of steps in which to create a map constitution file illustratively with the embodiment.

In step S46 of FIG. 16, a map constitution file region is acquired in the third memory means 106. In step S47, a pattern count is stored into the drawn pattern count region 71 of FIG. 14. This pattern count is taken from the graphic count region 45 of FIG. 13.

In step S48, steps S49, S50 and S51 are set to be repeated as many times as the graphic count stored in step S47. In step S49, data counts (for the number of angles in the polygon) are stored into the data count regions 72 and 75 of FIG. 14. These data counts are taken from the plotted point count regions 47, 50 and 71 of FIG. 13.

In step S50, step S51 is set to be repeated as many times as the number of plotted points stored in step S49. In step S51, the coordinate values held in the coordinate value regions 48 and 52 of FIG. 13 are stored into the x and y coordinate regions 73, 74 and 76 of FIG. 14.

With the data of the map constitution file 64' of FIG. 14 created in the above steps, step S52 turns the data into file format. Step S53 enters a file position pointer into the region of the map constitution file pointer 64 in the area data table 60' of FIG. 14. This pointer points to the position of the map constitution file 64' that was turned into file format in step S52.

Now the flow of the steps in FIG. 15 is resumed, and the description thereof continues. In step S54, an area aggregate file is created. This step is taken so as to keep the current status of the area in file format. In step S55, the station count taken from the owned station count region 25 of FIG. 6 is stored into the owned station count region 66 of FIG. 14.

In step S56, step S57 is set to be repeated as many times as the number of stations stored in step S55. In step S57, the station data 68' of FIG. 14 are created. How the station data 68' are created will be described in more detail with reference to the flowchart of FIG. 17.

Figure 17:
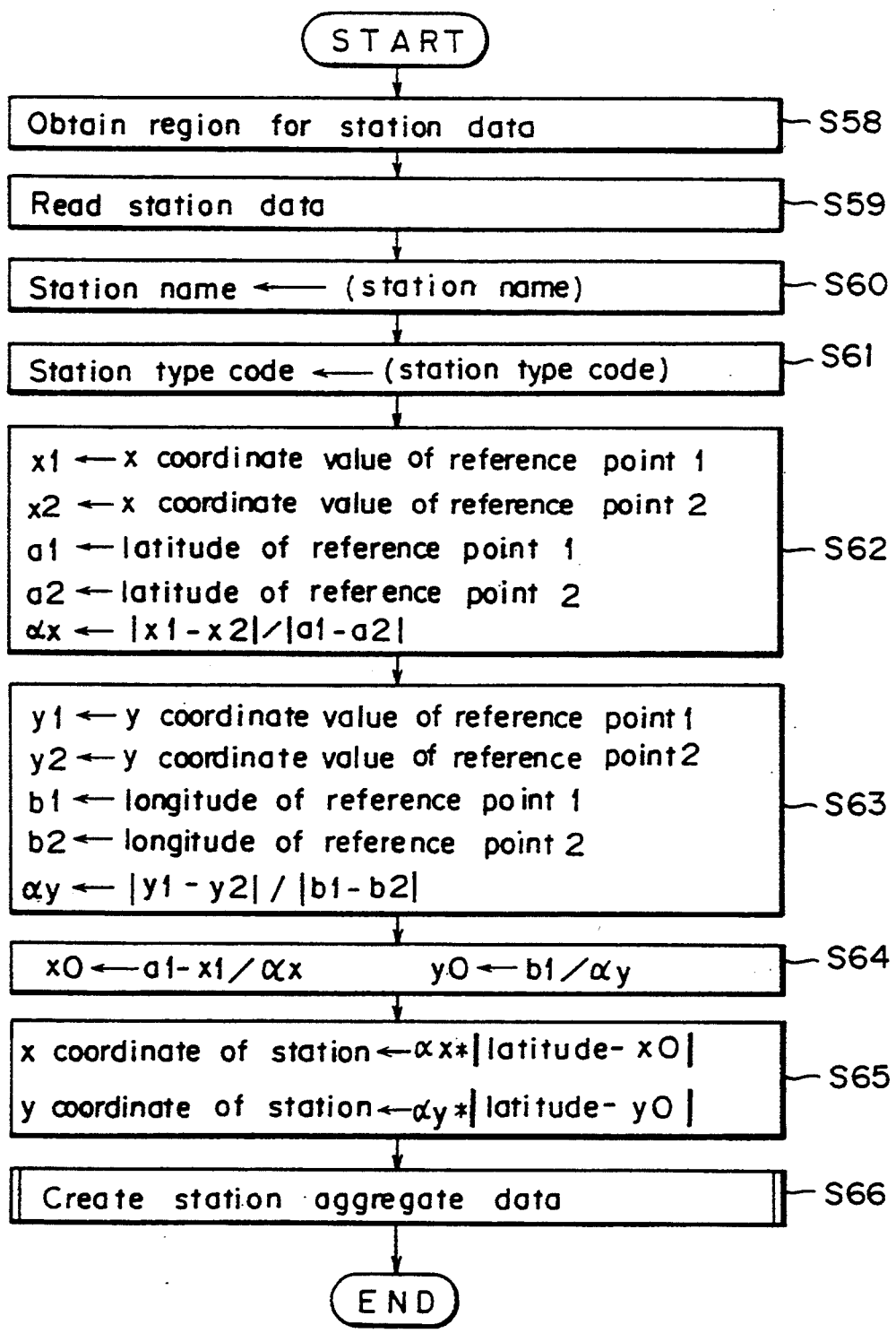
FIG. 17 is a flowchart of steps in which to create station data illustratively with the embodiment.

In step S58 of FIG. 17, the station data region 68' of FIG. 14 is acquired in the third memory means 106 of FIG. 1. In step S59, the station data D1 (D1', ...) of FIG. 6 are read in. In step S60, the station name taken from the station name regions 28 and 28' of FIG. 6 is placed into the station name region 77 of FIG. 14.

In step S61, the station type code taken from the station type code regions 29 and 29' of FIG. 6 is stored into the station type code region 78 of FIG. 14. In steps S62 and S63, the scale values $\alpha x$ and $\alpha y$ for displaying the map 113 on the graphic display 108 are obtained. The scale value $\alpha x$ means the x direction scale value for the drawn surface of the map 113, and the scale value $\alpha y$ the y direction scale value therefor.

More specifically, the scale value $\alpha x$ is obtained in step S62. The x coordinate value of the reference point 1 is read from the x and y coordinate region 41 in FIG. 13 for the reference point 1. The coordinate value thus read is taken as x1. The x coordinate value of the reference point 2 is then read from the x and y coordinate region 43 for the reference point 2. The coordinate value thus read is taken as x2. The latitude of the reference point 1 is read from the longitude/latitude region 42 for the reference point 1 and taken as a1. The latitude of the reference point 2 is read from the longitude/latitude region 44 for the reference point 2 and taken as a2.

The values x1, x2, a1 and a2 thus obtained are inserted in the following expression (1) whereby the scale value $\alpha x$ is acquired:

$$|x1-x2|/|a1-a2| \tag{1}$$

In step S63, the scale value $\alpha y$ is obtained. The y coordinate value of the reference point 1 is read from the x and y coordinate region 41 in FIG. 13 for the reference point 1. The coordinate value thus read is taken as y1. The y coordinate value of the reference point 2 is then read from the x and y coordinate region 43 for the reference point 2. The coordinate value thus read is taken as y2. The longitude of the reference point 1 is read from the longitude/latitude region 42 for the reference point 1 and taken as b1. The longitude of the reference point 2 is read from the longitude/latitude region 44 for the reference point 2 and taken as b2.

The values y1, y2, b1 and b2 thus obtained are inserted in the following expression (2) whereby the scale value $\alpha y$ is acquired:

$$|y1-y2|/|b1-b2| \tag{2}$$

In step S64, the coordinates of the reference point in the top left corner of the map are obtained. In other words, the coordinates (x0, y0) of the top-left reference point K0 in the map window (1) of FIG. 11 are obtained. Specifically, the coordinates are acquired by inserting into the following expressions (3) and (4) the values a1, b1, x1, y1, $\alpha x$ and $\alpha y$ obtained in steps S62 and S63:

$$a1 - x1/\alpha x \quad (3)$$

$$b1 - y1/\alpha y \quad (4)$$

The value x0 is obtained from the expression (3) and the value y0 from the expression (4). The values x0 and y0 are used to find the reference point K0.

In step S65, the display coordinates x and x of the station in question as it is displayed in the map window are obtained. First, as shown in FIG. 17, the absolute difference between the actual latitude and the value x0 is multiplied by $\alpha x$. This provides the display coordinate value x of the station. Then the absolute difference between the actual longitude and the value y0 is multiplied by $\alpha y$. This provides the display coordinate value y of the station.

Step S66 creates station aggregate data for designating the station on the graphic display and the color in which to display the station. The steps above create the station data 68' of FIG. 14.

In step S67 of FIG. 15, the area data table 60' of FIG. 14 created as described (i.e., the map data D3) is turned into file format for storage into the third memory means 106. Based on the resulting map data, the map display processing means 107 of FIG. 1 draws the map 113 on the graphic display 108. In drawing the map, the map display processing means 107 utilizes polygon drawing functions provided by the UNIX system (X-window). Furthermore, the stations, transmission routes and their names are accurately displayed on the graphic display 108.

As described, the image editing system for transmission network supervision embodying the present invention creates map data by which to draw transmission network images (area maps) more accurately than ever.

While a preferred embodiment of the invention has been described using specific terms, such description is for illustrative purposes only, and it is to be understood that changes and variations may be made without departing from the spirit or scope of the following claims.

What is claimed is:

1. An image editing system for transmission network supervision comprising:
   means for creating station data as a data source for graphically displaying a plurality of stations within a specific area;
   memory means for storing said station data;
   means for creating area data as a data source for graphically displaying a map of said specific area;
   means for creating, on the basis of said station data and said area data, map data for graphically displaying an area map including an image map of said specific area reduced to a desired scale, said plurality of stations superimposed on said image map and transmission routes connecting said plurality of stations;
   map memory means for storing said map data; and
   display means for graphically displaying said area map based on said map data;
   wherein said area data creating means creates said area data by first designating two reference points on a map of said specific area; reading said map containing said two reference points through an image scanner attached to said system for conversion to image data; displaying said image map in accordance with said image data on said display means arranged to appear within a window established on said display means; and plotting said two reference points and an outer frame of said image map to obtain coordinate values of said image map;
   wherein said map creating means comprises:
   means for obtaining an x direction scale value of said image map by dividing an absolute difference between x coordinate values of two display reference points on said image map by an absolute difference between latitude values of said two reference points on the map of said specific area;
   means for obtaining a y direction scale value of said image map by dividing the absolute difference between y coordinate values of said two display reference points by an absolute difference between longitude values of said two reference points;
   means for obtaining an x coordinate value of a window reference point for providing screen display reference of said window by first dividing the x coordinate value of one of said two display reference points by said x direction scale value, and by subtracting a resulting quotient from a latitude value of one of said two reference points;
   means for obtaining a y coordinate value of said window reference point by first dividing the y coordinate value of said one of two display reference points by said y direction scale value, and by subtracting a resulting quotient from a longitude value of said one of two display reference points;
   means for obtaining an x coordinate value of station display coordinates for displaying each of said plurality of stations on said image map displayed in said window, said x coordinate value being obtained by first subtracting the x coordinate value of said window reference point from an actual latitude value of each of said plurality of stations, and by multiplying a resulting difference by said x direction scale value; and
   means for obtaining a y coordinate value of station display coordinates for displaying each of said plurality of stations on said image map displayed in said window, said y coordinate value being obtained by first subtracting the y coordinate value of said window reference point from an actual latitude value of each of said plurality of stations, and by multiplying a resulting difference by said x direction scale value.

2. A method for editing images for a transmission network supervision system comprising the steps of:
   creating station data as a data source for graphically displaying a plurality of stations within a specific area;
   storing said station data in a memory;
   creating area data as a data source for graphically displaying a map of said specific area;
   creating, on the basis of said station data and said area data, map data for graphically displaying an area map, said area map including an image map of said specific area reduced to a desired scale, said plurality of stations superimposed on said image map and transmission routes connecting said plurality of stations, said creating map data further including the steps of:
   obtaining an x direction scale value of said image map by dividing an absolute difference between x coordinate values of two display reference points on said image map by an absolute difference between latitude values of said two reference points on the map of said specific area;

obtaining a y direction scale value of said image map by dividing an absolute difference between y coordinate values of said two display reference points by an absolute difference between longitude values of said two reference points;

obtaining an x coordinate value of a window reference point for providing screen display reference of said window by first dividing the x coordinate value of one of said two display reference points by said x direction scale value, and by subtracting a resulting quotient from a latitude value of one of said two reference points;

obtaining a y coordinate value of said window reference point by first dividing the y coordinate value of said one of two display reference points by said y direction scale value, and by subtracting a resulting quotient from a longitude value of said one of two display reference points;

obtaining an x coordinate value of station display coordinates for displaying each of said plurality of stations on said image map displayed in said window, said x coordinate value being obtained by first subtracting the x coordinate value of said window reference point from an actual latitude value of each of said plurality of stations, and by multiplying a resulting difference by said x direction scale value; and obtaining a y coordinate value of station display coordinates for displaying each of said plurality of stations on said image map displayed in said window, said y coordinate value being obtained by first subtracting the y coordinate value of said window reference point from an actual longitude value of each of said plurality of stations, and by multiplying a resulting difference by said y direction scale value;

storing said map data in a map memory; and graphically displaying said area map based on said map data.

* * * * *

UNITED STATES PATENT AND TRADEMARK OFFICE
CERTIFICATE OF CORRECTION

PATENT NO. : 5,392,395
DATED : February 21, 1995
INVENTOR(S) : Fujii et al.

It is certified that error appears in the above-indentified patent and that said Letters Patent is hereby corrected as shown below:

Column 3, line 4, delete "s" and insert --is--.

Column 5, line 24, after "picture" insert --12--.

Column 9, line 42, after "region" insert --63--.

Signed and Sealed this

Tenth Day of October, 1995

Attest:

BRUCE LEHMAN

Attesting Officer      Commissioner of Patents and Trademarks